March 14, 1944.   G. A. DEL VALLE   2,343,961
FILM TAKE-UP
Filed Oct. 31, 1941
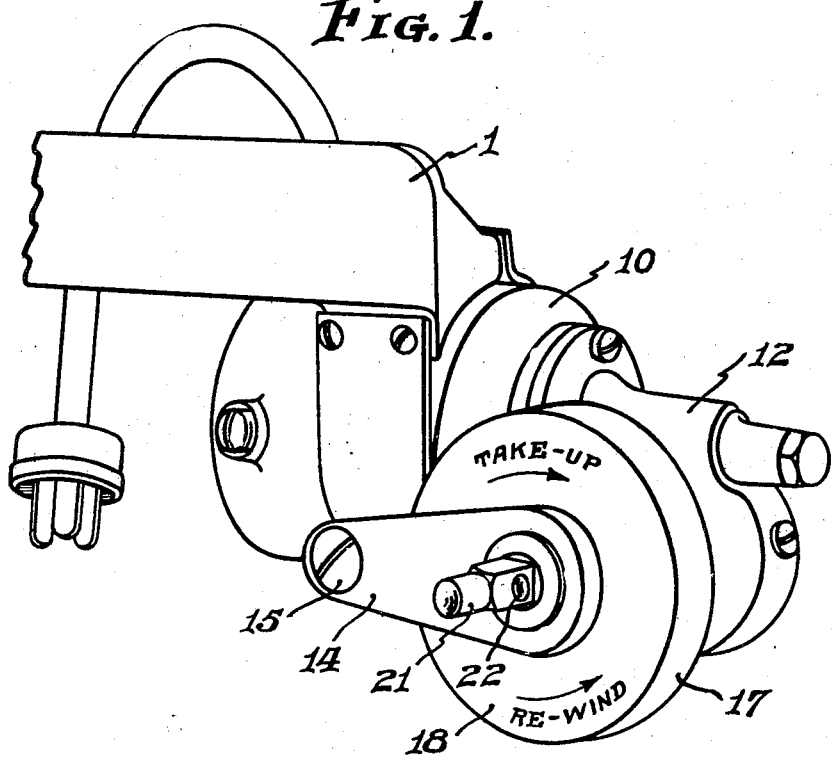
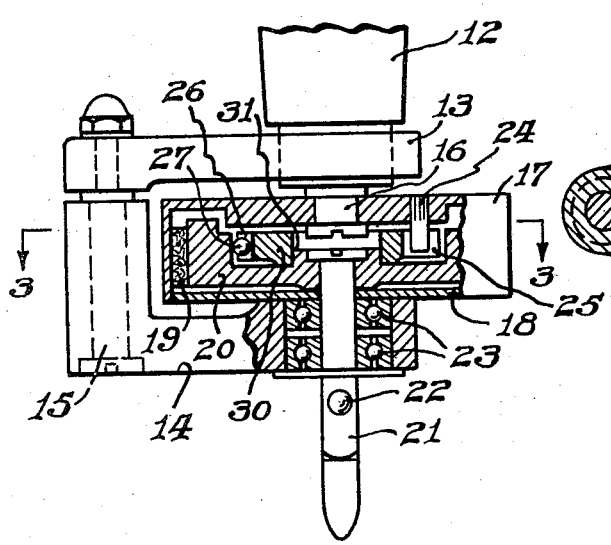
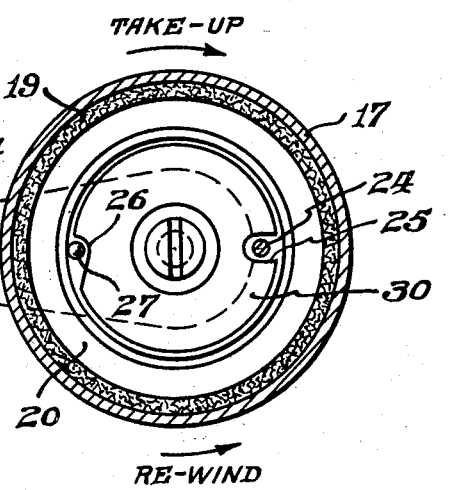
Inventor
Guillermo A. del Valle Patented Mar. 14, 1944

2,343,961

UNITED STATES PATENT OFFICE 2,343,961

FILM TAKE-UP

Guillermo Adalberto del Valle, Indianapolis, Ind., assignor to Radio Corporation of America, a corporation of Delaware Application October 31, 1941, Serial No. 417,388

2 Claims. (Cl. 242—55)

This invention relates to a takeup device for taking up film in motion picture apparatus and which is particularly adapted to taking up the type of non-inflammable film used in 16 mm. motion picture projectors. The apparatus provides an automatic increase in the torque applied to the film reel as the diameter of the roll of film thereon increases so as to maintain the tension on the film uniform and it also provides a positive drive for rewinding film, both of these features being included in a relatively compact and simple construction.

The film reel is carried on a driving shaft which is supported by bearings in a movable arm and the shaft carries a driven member which for movement of the arm is caused to engage a driving member through a friction clutch. Movement of the arm is accomplished by the weight of the film on the reel and the torque applied to the reel is accordingly varied in accordance with the weight of the film thereon.

One object of the invention is to provide an improved film takeup.

Another object of the invention is to provide a film takeup which will apply substantially uniform tension to the film regardless of the quantity of film on the real.

Another object of the invention is to provide a compact and simple motor driven film takeup.

Another object of the invention is to provide a film takeup which is frictionally driven for taking up film during the operation of a motion picture apparatus but which is positively driven for rewinding the film.

Other and incidental objects of the invention will be apparent to those skilled in the art from a reading of the following specification and an inspection of the accompanying drawing in which Figure 1 is a perspective view of the film takeup, Figure 2 is a longitudinal section through the takeup drive mechanism and the supporting arm, and Figure 3 is a view partly in section taken along the line 3—3 of Figure 2.

Referring first to Fig. 1, an appropriate motor preferably of the series type is indicated at 10 and is supported on the bracket 1 which may be mounted on an appropriate portion of the motion picture apparatus. The motor 10 carries at its outer end a casing 12 which encloses an appropriate reduction gear and serves to support the remainder of the takeup drive mechanism as shown in more detail in Fig. 2.

As shown in Fig. 2, the member 12 carries an arm 13 on which there is pivoted a second arm 14 by means of the screw 15. The shaft from the reduction gear connected to the motor is indicated at 16 and, passing through the member 12, supports the casing 17 which is provided with an appropriate cover 18. Within this cover 18 there is loosely carried a ring or belt of oiled or greased felt or other equivalent material 19 which may nearly but not quite fill the space between the cover 17 and the periphery of the driven member 20.

The member 20 is carried on the shaft 21 running in the bearings 23 in the arm 14. The member 20, the shaft 21 and the arm 14 are, therefore, movable vertically as a unit in relation to the casing 17.

When a film take-up reel is placed on the shaft 21 and the film connected thereto, the weight of the reel, the arm 14 and the member 20 presses the member 20 down into contact with the lubricated member 19. When the motor 10 is then operated in the take-up direction, the film is taken up on the reel under the torque produced by the friction between the member 19 and the member 20 or between the casing 17 and the member 19, whichever slips the more readily. Ordinarily, slippage will occur between the member 19 and the member 20. As film is wound onto the take-up reel, the weight of the movable portion of the apparatus is increased by the weight of the film, and the downward pressure of the member 20 against the lubricated felt 19 is increased by a corresponding amount, thereby increasing the torque as the weight of film on reel is increased and maintaining the tension on the film effectively constant.

In rewinding the film, the motor is operated in the opposite direction from that used in taking up film on the reel, as indicated in Figure 1. The take-up does not operate through the clutch 19 but through an independent over-running clutch. The casing 17 is provided with a driving pin 24 which extends into an appropriate slot in a member 30 which runs on a collar 31 formed in the member 20. The member 30 is provided with an appropriately shaped notch 26 enclosing a ball 27 which, by cooperation with the notch, forms an over-running clutch. It will be apparent from the drawing that, when the motor is operating in the take-up direction, the ball 27 rides freely in the notch 26, while, when the motor is operated in the rewind direction, the ball 27 is wedged between the member 30 and the member 20, thereby causing the member 20 and the shaft 21 to be positively driven through the pin 24.

This arrangement is not only very compact but it avoids the necessity so usual in rewind devices for changing belts or shifting gears in order to rewind the film, the only change that is necessary being movement of an appropriate reversing switch on the motor to the rewind position or take-up position, as the case may be.

In some of the earlier 16 mm. projectors it was customary to re-wind the film through the machine or to re-wind from the take-up reel back to the let-off reel which was driven for the purpose of re-winding. In 35 mm. theatre projectors, re-winding is always performed in separate re-winding machine. In present day 16 mm. projectors, after the exhibition of a reel of film, the full reel is customarily placed on the upper or let-off reel spindle which may be provided with a light brake, and the film is then re-wound onto an empty reel placed on the take-up reel spindle which for this purpose must be driven in the opposite direction to that in which it was driven for taking up film through the projector. This is necessary in order that the film may be wound onto the reel in the proper direction to be again run through the machine. In this re-winding operation, the driven reel may be run at a considerably higher speed than in the ordinary take-up operation.

This procedure avoids the weight and complication of driving mechanism for the upper reel.

I claim as my invention:

1. Film take-up mechanism including a driving member, a round casing carried by said driving member, annular friction coupling means within said casing, a circular driven member within said annular means and coupled thereby to said casing, film reel carrying means driven by said driven means, and an overrunning clutch additionally coupling said casing and said circular driven member.

2. Film take-up mechanism including a driving member, a round casing carried by said driving member, annular friction coupling means within said casing, a circular driven member within said annular means and coupled thereby to said casing, film reel carrying means driven by said driven means, means supporting said driven member and reel carrying means for vertical movement in response to the weight of the film, and an overrunning clutch additionally coupling said casing and said circular driven member.

GUILLERMO A. DEL VALLE.